United States Patent
Cranch et al.

(10) Patent No.: US 10,018,646 B2
(45) Date of Patent: Jul. 10, 2018

(54) FIBER OPTIC SENSOR AND METHOD FOR DETECTING SHOCK WAVE PRESSURE AND MASS VELOCITY IN SOLID MEDIA

(71) Applicants: Geoffrey A. Cranch, Fairfax Station, VA (US); Jacob Grun, Silver Spring, MD (US)

(72) Inventors: Geoffrey A. Cranch, Fairfax Station, VA (US); Jacob Grun, Silver Spring, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 375 days.

(21) Appl. No.: 14/482,580

(22) Filed: Sep. 10, 2014

(65) Prior Publication Data
US 2015/0323558 A1 Nov. 12, 2015

Related U.S. Application Data

(60) Provisional application No. 61/901,730, filed on Nov. 8, 2013.

(51) Int. Cl.
*G01P 3/36* (2006.01)
*G01L 1/00* (2006.01)
*G01D 5/26* (2006.01)

(52) U.S. Cl.
CPC .......... *G01P 3/36* (2013.01); *G01D 5/266* (2013.01); *G01D 5/268* (2013.01); *G01L 1/00* (2013.01)

(58) Field of Classification Search
USPC ........................................................ 356/28.5
See application file for complete search history.

(56) References Cited

U.S. PATENT DOCUMENTS

| | | | | |
|---|---|---|---|---|
| 2008/0297808 A1* | 12/2008 | Riza | ................... | G01B 9/02004 356/503 |
| 2013/0120756 A1* | 5/2013 | Spross | ..................... | G01B 9/02 356/477 |

OTHER PUBLICATIONS

T. Pezeril, G. Saini, D. Veysset, S. Kooi, P. Fidkowski, R. Radovitzky, and K. Nelson, "Direct visualization of laser-driven focusing shock waves," Phys. Rev. Lett. 106, 214503 (May 2011).

(Continued)

*Primary Examiner* — Luke D Ratcliffe
(74) *Attorney, Agent, or Firm* — US Naval Research Laboratory; Suresh Koshy (57) ABSTRACT

A fiber optic pressure and mass velocity sensor for measuring a shock wave pressure in a solid media includes an optical fiber having a means for measuring a change in an optical path length (OPL) of the fiber when positioned in the solid media caused by the shock wave altering the physical length of the fiber and the refractive index of the fiber. The means for measuring the change in the OPL is coupled at one end to a laser and at its second end to a means for detecting the change in OPL. The sensor has a high operating bandwidth (>>10 MHz), is sufficiently rigid to withstand the force of the shock wave, has a sensitivity that can also be tailored for the application, and is immune to electromagnetic interference. Measurement can be made on materials under extreme strain conditions, and the sensor can also provide characterization of protective materials such as bullet/blast proof materials.

9 Claims, 11 Drawing Sheets

(56) References Cited

OTHER PUBLICATIONS

N. E. Fisher, D. J. Webb, C. N. Pannell, D. A. Jackson, L. R. Gavrilov, J. W. Hand, L. Zhang, and I. Bennion, "Ultrasonic hydrophone based on short in-fiber Bragg gratings," Appl. Opt. 37, 8120-8128 (Dec. 1998).
P. Fomitchov and S. Krishnaswamy, "Response of a fiber Bragg grating ultrasonic sensor," Opt. Eng. 42, 956-963 (Apr. 2003).
G. Flockhart, M. McGuire, S. Pierce, G. Thursby, G. Stewart, G. Hayward, and B. Culshaw, "Direct monitoring of underwater ultrasonic transducers in the near field using fibre Bragg grating sensors," Proc. SPIE 7503, 750331 (Oct. 2009).
W. N. MacPherson, M. J. Gander, J. S. Barton, J. D. C. Jones, C. L Owen, A. J. Watson, and R. M. Allen, "Blast-pressure measurement with a high-bandwidth fibre optic pressure sensor," Meas. Sci. Technol. 11, 95-102 (Oct. 1999).
S. Watson, M. J. Gander, W. N. MacPherson, J. S. Barton, J. D. C. Jones, T. Klotzbuecher, T. Braune, J. Ott, and F. Schmitz, "Laser-machined fibers as Fabry-Perot pressure sensors," Appl. Opt. 45, 5590-5596 (Aug. 2006).
S. Watson, W. N. MacPherson, J. S. Barton, J. D. C. Jones, A. Tyas, A. V. Pichugin, A. Hindle, W. Parkes, C. Dunare, and T. Stevenson, "Investigation of shock waves in explosive blasts using fibre optic pressure sensors," Meas. Sci. Technol. 17, 1337-1342 (Jan. 2006).
W. Parkes,V. Djakov,J.S. Barton,S.Watson,W.N.MacPherson, J. T. M. Stevenson, and C. C. Dunare, "Design and fabrication of dielectric diaphragm pressure sensors for applications to shock wave measurement in air," J. Micromech. Microeng. 17, 1334-1342 (Jun. 2007).
P. Morris, A. Hurrell, A. Shaw, E. Zhang, and P. Beard, "A Fabry-Perot fiber-optic ultrasonic hydrophone for the simultaneous measurement of temperature and acoustic pressure," J. Acoust. Soc. Am. 125, 3611-3622 (Jun. 2009).
J. Staudenraus and W. Eisenmenger, "Fiberoptic probe hydrophone for ultrasonic and shock-wave measurements in water," Ultrasonics 31, 267-273 (Dec. 1992).
R. G. Minasamudram, P. Arora, G. Gandhi, A. S. Daryoush, M. A. El-Sherif, and P. A. Lewin, "Thin film metal coated fiber optic hydrophone probe," Appl. Opt. 48, G77-G82 (Nov. 2009).
C. Koch, G. Ludwig, and W. Molkenstruck, "Calibration of a fiber tip ultrasonic sensor up to 50 mhz and the application to shock wave measurement," Ultrasonics 36, 721-725 (Feb. 1998).
C. Koch and K.-V. Jenderka, "Measurement of sound field in cavitating media by an optical fibre-tip hydrophone," Ultrason. Sonochem. 15, 502-509 (Jun. 2007).
T. Lehecka, S. Bodner, A. V. Deniz, A. N. Mostovych, S. P. Obenschain, C. J. Pawley, and M. S. Pronko, "The NIKE KrF laser fusion facility," J. Fusion Energ. 10, 301-303 (Dec. 1991).
J. D. Sethian, M. Myers, J. L. Giuliani, R. Lehmberg, P. Kepple, M. F. Wolford, F. Hegeler, M. Friedman, S. B. Swanekamp, D. Weidenheimer, and D. Rose, "Development of krypton fluoride lasers for fusion energy," in Inertial Fusion Sciences and Applications (Dec. 2003), pp. 517-522.
J. E. Carlson, "Frequency and temperature dependence of acoustic properties of polymers used in pulse-echo systems," in IEEE Symposium on Ultrasonics (IEEE, Oct. 2003), pp. 885-888.

* cited by examiner

FIBER OPTIC SENSOR AND METHOD FOR DETECTING SHOCK WAVE PRESSURE AND MASS VELOCITY IN SOLID MEDIA

CROSS-REFERENCE TO RELATED APPLICATIONS

This application claims the benefit of U.S. Provisional Application 61/901,730 filed on Nov. 8, 2013, and incorporated herein by reference.

FIELD OF THE INVENTION

The invention is directed to a fiber optic pressure and mass velocity sensor and method for its use, and in particular to a method for measuring shock wave pressure and mass velocity in a solid media.

BACKGROUND OF THE INVENTION

Understanding laser-driven shock wave propagation is useful for a number of practical applications, ranging from nuclear fusion experiments [M. Schirber, "For nuclear fusion, could two lasers be better than one?" Science 310, 1610-1611 (2005)] to synthesis of protective materials [J.-H. Lee, D. Veysset, J. Singer, M. Retsch, G. Saini, T. Pezeril, K. Nelson, and E. Thomas, "High strain rate deformation of layered nanocomposites," Nature Communications 3 (2012)], in addition to basic studies on materials in extreme conditions. However, direct measurements on shock waves propagating in solid media are difficult due to the high pressure generated by the shock. In transparent media, optical imaging techniques can be used to image the shock front [T. Pezeril, G. Saini, D. Veysset, S. Kooi, P. Fidkowski, R. Radovitzky, and K. Nelson, "Direct visualization of laser-driven focusing shock waves," Physical Review Letters 106 (2011)], from which shock wave speed and peak pressure can be determined. However, in opaque media, measurement techniques are limited. A pressure sensor must be sufficiently rigid to withstand the shock wave, which may generate pressures around $10^{10}$ Pa. It must also be sufficiently small to provide a fast response time and to avoid measurement error due to the curvature of the shock front. Events that generate shock waves also generate large amounts of electromagnetic energy, which can interfere with electronic sensors.

Dielectric sensors, such as those based on fiber optics, can provide immunity from electromagnetic interference, a sufficiently small sensor head capable of a fast response time and a solid sensor head capable of withstanding extremely high pressures in a solid structure. Such a measurement capability will enable improved understanding of shock wave propagation in solid media by determining material characteristics such as shock wave speed and its relationship to shock pressure as well as behavior of the shock wave at interfaces and boundaries.

There have been many reported demonstrations of fiber optic sensors for measurement of ultrasonics and shock waves in liquids and air. The fiber Bragg grating (FBG) strain sensor has been investigated for measurement of ultrasonics in water [see, e.g., N. E. Fisher, D. J. Webb, C. N. Pannell, D. A. Jackson, L. R. Gavrilov, J. W. Hand, L. Zhang, and I. Bennion, "Ultrasonic hydrophone based on short in-fiber Bragg gratings," Applied Optics 37, 8120-8128 (1998), P. Fomitchov and S. Krishnaswamy, "Response of a fiber Bragg grating ultrasonic sensor," Optical Engineering 42, 956-963 (2003), and G. Flockhart, M. McGuire, S. Pierce, G. Thursby, G. Stewart, G. Hayward, and B. Culshaw, "Direct monitoring of underwater ultrasonic transducers in the near field using fibre Bragg grating sensors," Proceedings of SPIE—The International Society for Optical Engineering 7503 (2009)]. Fabry-Perot sensors based on an air-backed diaphragm formed on the tip of an optical fiber have been reported for measurement of blast driven shock waves in air [see, e.g., W. N. MacPherson, M. J. Gander, J. S. Barton, J. D. C. Jones, C. L. Owen, A. J. Watson, and R. M. Allen, "Blast-pressure measurement with a high-bandwidth fibre optic pressure sensor," Measurement Science and Technology 11, 95-102 (2000), S. Watson, M. J. Gander, W. N. MacPherson, J. S. Barton, J. D. C. Jones, T. Klotzbuecher, T. Braune, J. Ott, and F. Schmitz, "Laser-machined fibers as fabry-perot pressure sensors," Applied Optics 45, 5590-5596 (2006), S. Watson, W. N. MacPherson, J. S. Barton, J. D. C. Jones, A. Tyas, A. V. Pichugin, A. Hindle, W. Parkes, C. Dunare, and T. Stevenson, "Investigation of shock waves in explosive blasts using fibre optic pressure sensors," Measurement Science and Technology 17, 1337-1342 (2006), and W. Parkes, V. Djakov, J. S. Barton, S. Watson, W. N. MacPherson, J. T. M. Stevenson, and C. C. Dunare, "Design and fabrication of dielectric diaphragm pressure sensors for applications to shock wave measurement in air," Journal of Micromechanics and Microengineering 17, 1334-1342 (2007)]. A solid Fabry-Perot formed on the tip of a fiber has also been reported for measurement of ultrasonics in liquids [P. Morris, A. Hurrell, A. Shaw, E. Zhang, and P. Beard, "A fabry-perot fiber-optic ultrasonic hydrophone for the simultaneous measurement of temperature and acoustic pressure," Journal of the Acoustical Society of America 125, 3611-3622 (2009)]. A fiber tip sensor based on measurement in the change in the Fresnel reflection at the fiber endface has been demonstrated [J. Staudenraus and W. Eisenmenger, "Fiberoptic probe hydrophone for ultrasonic and shock-wave measurements in water," Ultrasonics 31, 267-273 (1993)]. This utilizes the dependence of the refractive index on pressure in water, which modulates the reflected intensity from the fiber endface. This technique has been improved by using a tapered gold coated fiber tip [R. G. Minasamudram, P. Arora, G. Gandhi, A. S. Dary-oush, M. A. El-Sherif, and P. A. Lewin, "Thin film metal coated fiber optic hydrophone probe," Applied Optics 48, G77-G82 (2009)]. Another fiber tip sensor based on the measurement of the phase shift in the light reflected from a mirrored fiber end, that forms one arm of a Michelson interferometer, has also been demonstrated for measurements of shock waves in liquids [C. Koch, G. Ludwig, and W. Molkenstruck, "Calibration of a fiber tip ultrasonic sensor up to 50 MHz and the application to shock wave measurement," Ultrasonic's 36, 721-725 (1998) and C. Koch and K.-V. Jenderka, "Measurement of sound field in cavitating media by an optical fibre-tip hydrophone," Ultrasonics Sonochemistry 15, 502-509 (2008)].

Despite numerous demonstrations of shock wave measurement in air and liquids, there have been no demonstrations in solids using fiber optic pressure sensors.

BRIEF SUMMARY OF THE INVENTION

According to the invention, a device for measuring shock wave pressure in a solid media in one embodiment employs a fiber Fabry-Perot sensor, consisting of two gold coating mirrors separated by a thick polymer spacer, formed on the tip of a single mode optical fiber. The device forms an optical resonator, where the wavelength of the resonances depends on the cavity length. The device is embedded in a solid media in which a shock wave is generated, the shock wave modulating the length of the cavity, which causes a change in the reflected intensity of the laser that is measured by a photodiode receiver. Another embodiment is based on a reflecting fiber end incorporated into a Michelson interferometer.

The invention has a high operating bandwidth (>>10 MHz), is sufficiently rigid to withstand the force of the shock wave, its sensitivity can also be tailored for the application, and is immune to electromagnetic interference. In one embodiment it is capable of measuring the direction of shock wave. The invention measures the mechanical deformation of the cavity due to the shock wave. It is capable of measuring shock waves in opaque solid media.

Measurement can be made on materials under extreme strain conditions (i.e. very high strain rate). The invention provides a fundamental understanding of shock wave propagation in solid media (nuclear fusion experiments, basic studies on materials). The invention can also provide characterization of protective materials (i.e. bullet/blast proof materials).

DETAILED DESCRIPTION OF THE INVENTION

Figure 1:
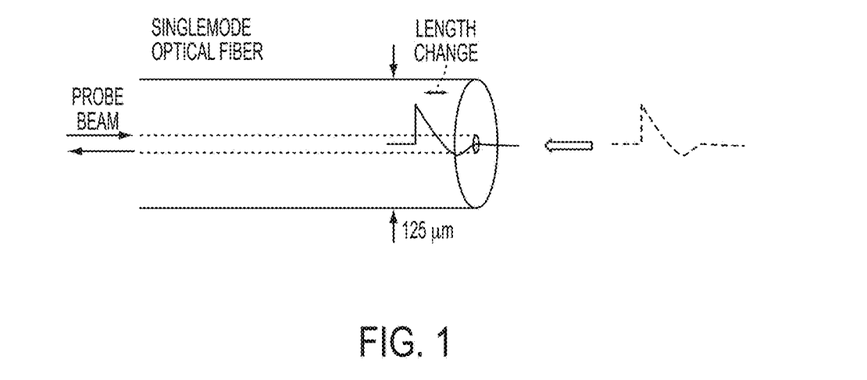
FIG. 1 is a schematic illustrating the operating principle of a fiber optic pressure probe.

Shock Wave Measurement Techniques
Pressure Sensors:
The basic principle of the fiber tip sensor is shown in FIG. 1. A shock wave entering the fiber from the right causes a change in optical path length (OPL) of the optical fiber. This OPL change arises from both a change in physical length of the fiber and a change in refractive index. This change in path length can be measured by placing an optical device at the tip of the fiber that can respond to this length change.

Three sensor types have been employed in the invention to measure this change in OPL. These are now described.

Fiber Fabry-Perot Sensor

Figure 2A:
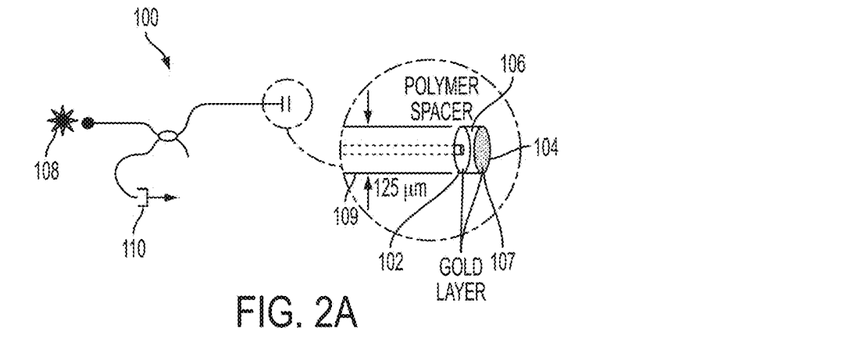
FIGS. 2A-D show 4 pressure sensors: fiber Fabry-Perot, fiber Bragg grating, Michelson interferometer, and packaged sensor, respectively.
Figure 3A:
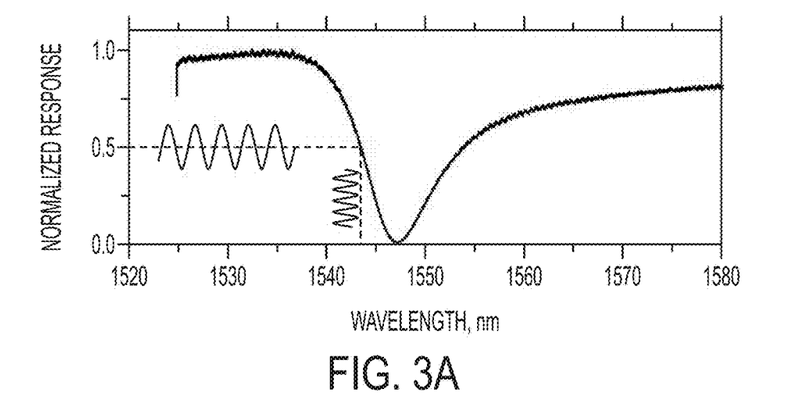
FIGS. 3A and B respectively show the optical spectra of a fiber Fabry-Perot and a fiber Bragg grating.

Referring now to FIG. 2A, a fiber Fabry-Perot sensor 100 is of the type described in P. Morris, A. Hurrell, A. Shaw, E. Zhang, and P. Beard, "A fabry-perot fiber-optic ultrasonic hydrophone for the simultaneous measurement of temperature and acoustic pressure," Journal of the Acoustical Society of America 125, 3611-3622 (2009). It consists of two gold coating mirrors 102 and 104 separated by a spacer 106, e.g. a 10 μm thick polymer spacer (Parylene-C), as illustrated in the inset of FIG. 2A. This is formed on the tip 107 of a single mode optical fiber 109, which is 125 μm in diameter. A single frequency laser 108 (e.g., an HP81689A) is tuned to the lower wavelength half-power point of the optical resonance as illustrated in FIG. 3A. A change in the thickness of the polymer spacer due to the shock wave will change the position of the resonance, causing a change in the reflected intensity of the laser. If this change is small compared to the spectral width of the resonance, the change in intensity will scale linearly with the change in resonance position. The received power is detected with a high bandwidth photodiode receiver 110 (e.g., a TTI TIA-500). The received power was −11 dBm.

Fiber Bragg Grating Sensor

Figure 2B:
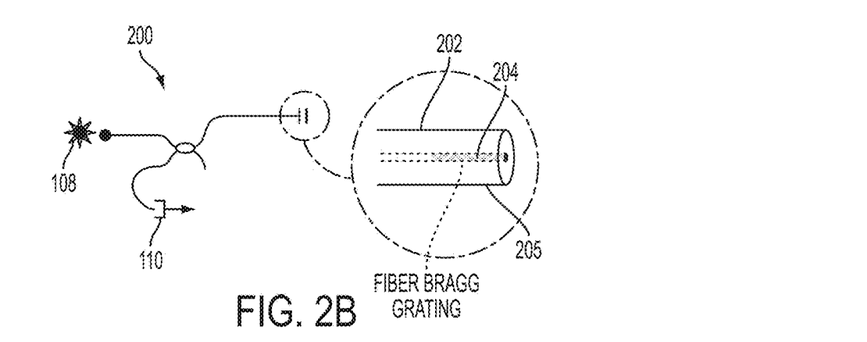

Referring now to FIG. 2B, a fiber Bragg grating (FBG) 200 is inscribed in a single mode optical fiber 202 (SMF-28) using a phase mask at 244 nm (CW). This fiber was cleaved to form a 0.5 mm±100 μm long FBG 204 at the tip 205 of the fiber (an angle cleave was used to reduce the Fresnel reflection from the fiber end), as shown in the inset of FIG. 2B. The FBG length was monitored using an optical frequency domain reflectometer. Preferably, the FBG length is in a range of from 0.1 mm to 0.6 mm.

Figure 3B:
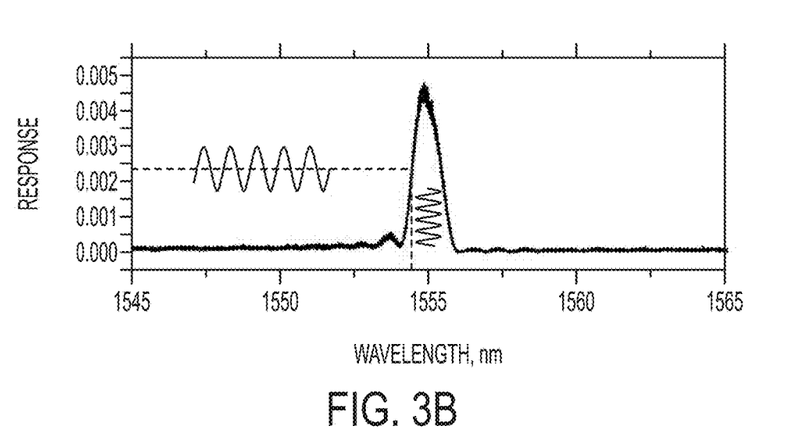

The FBG sensor 200, shown in FIG. 2B, was interrogated by tuning laser 108 (an HP81689A) to the half-power point of the reflection spectrum, as illustrated in FIG. 3B, and measuring the intensity of the reflected laser signal on the receiver 110 (a TTI TIA-500). The peak power reflectivity of the FBG was approximately 1% and yielded a received power of −20 dBm.

Michelson Interferometer Fiber Tip Sensor

Figure 2C:
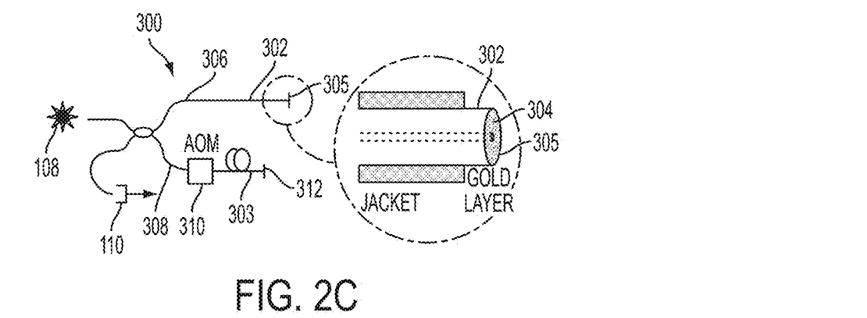

Referring now to FIG. 2C, a Michelson interferometer (MI) based sensor 300 comprises a cleaved first optical fiber 302 having a mirror surface coating 304 formed on the end face 305. This fiber is placed in one arm 306 of a fiber optic Michelson interferometer. The other arm 308 contains an acousto-optic modulator (AOM) 310 and a second cleaved optical fiber 303 with a surface-mirror-coated end face 312. The interferometer 300 is probed with a coherent laser 109 (NP Photonics), such that a heterodyne carrier at 200 MHz is generated at the detector 111 (New Focus 1554). Shock induced length changes in the fiber tip will modulate the phase of the heterodyne frequency. The carrier is down converted to 20 MHz and recorded as a time series on a digital oscilloscope. The phase information is extracted using a Hilbert Transform to determine the instantaneous frequency. Temporal integration of this signal provides the required phase information. Preferably, the axial spacing between endfaces 305 and 312 is in the range of from 1 to 250 μm.

As shown in FIGS. 3A and B, the optical spectra of the fiber Fabry-Perot and the fiber Bragg grating are measured by scanning a tunable laser across the resonance and recording the reflected power.

Figure 2D:
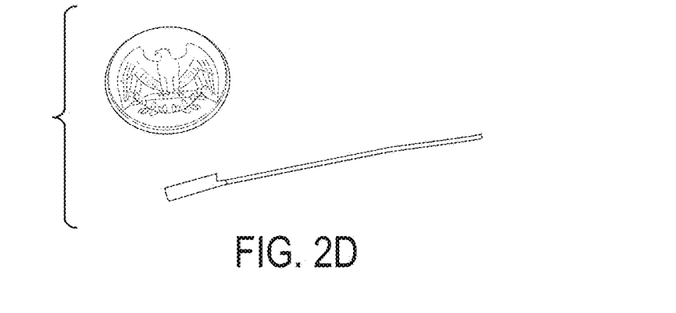

Before insertion into the PMMA block, these sensors are molded into a cylinder of high thermal heat transfer epoxy (50-3100) measuring 3 mm diameter by 6 mm long, shown FIG. 2D. The tip of the sensor is aligned with the end face of the cylinder and the fiber exits the other end of the cylinder through a bifurcation tube.

The fiber Fabry-Perot and fiber Bragg grating sensor provide a point-like measurement of the local disturbance. They respond to local volumetric compression of the cavity and therefore respond to the change in pressure induced by the shock wave. Displacements occurring outside of the Fabry-Perot or FBG do not contribute to the response. However, the interferometer responds to displacements anywhere along the sensing fiber. To ensure adequate response time is obtained, the shock wave must not propagate far along the fiber. Only the fiber tip is adhered to the epoxy to reduce the propagation of the shock wave along the fiber. The trailing fiber is loosely contained with the bifurcation tube. This sensor has a number of benefits over the Fabry-Perot and FBG sensors. The sensor responds to axial displacements of the end mirror. As such its response is proportional to mass displacement along the axis of the fiber. Temporal integration of the measured phase thus yields the particle velocity. The particle velocity can be related to the local pressure through the relationship, $P=\rho \cdot U_s \cdot U_m$ where P is the pressure, $\rho$ is the material density, $U_s$ is the shock velocity and $U_m$ is the mass velocity. This sensor is also directional in that it responds preferentially to displacements along the axis of the fiber. Furthermore, by encoding the displacement information as a phase modulation, the dynamic range of the sensor is determined by the available bandwidth, which is set by the carrier frequency. A larger dynamic range is obtained by increasing the carrier frequency without any loss of linearity or sensitivity. Interferometric measurement is also expected to yield a higher sensitivity.

Shadowgraphy

The shock wave is also imaged as it propagates through the test block using shadowgraphy [see G. S. Settles, *Schlieren and shadowgraph techniques: Visualizing phenomena in transparent media* (Springer-Verlag, Berlin, 2001)]. The block is illuminated with a Verdi V-10 diode-pumped laser (Coherent Inc). The beam is expanded, collimated and passed through the side of the test block before being imaged onto a high speed SIM 8 camera (Photo-Sonics Inc). The camera aperture is open for 50 ns and the frame rate 3 μs.

Experimental Procedure and Results

Figure 4A:
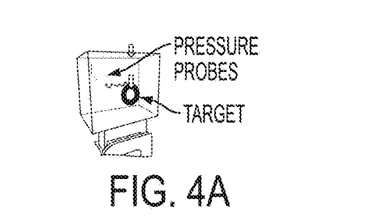
FIG. 4A is a schematic of a laser induced shock system with three pressure probes installed in a test block for initial tests according to the invention.
Figure 4B:
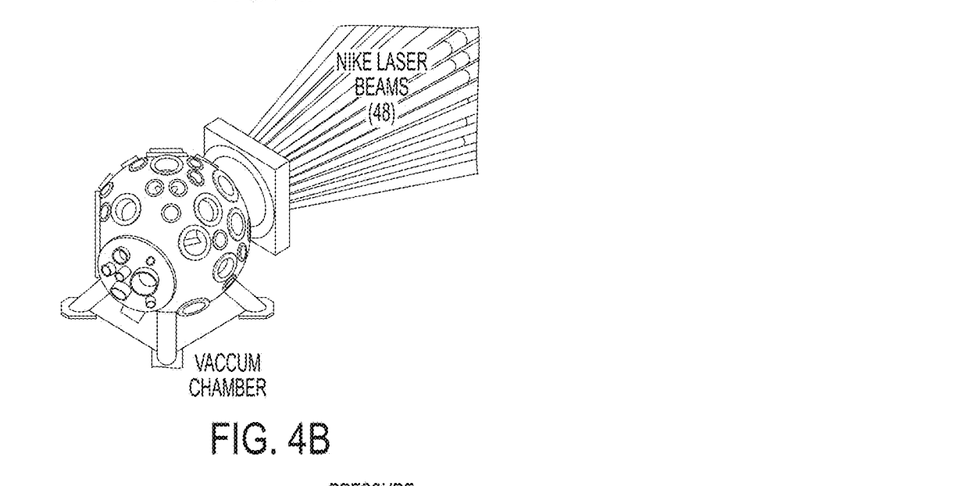
FIG. 4B shows the NIKE laser used with the test block shown in FIG. 4A.
Figure 4C:
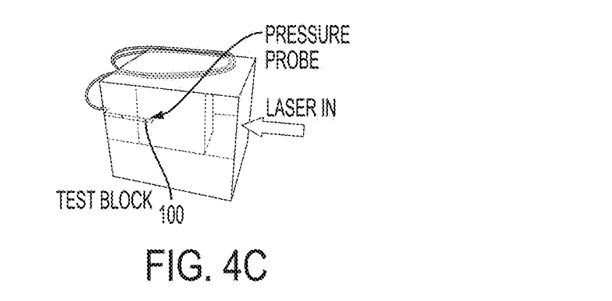
FIGS. 4C and 4D show a Fabry-Perot sensor installed in a test block illustrating a detailed arrangement of a Fabry-Perot sensor in the test block according to the invention.
Figure 4D:
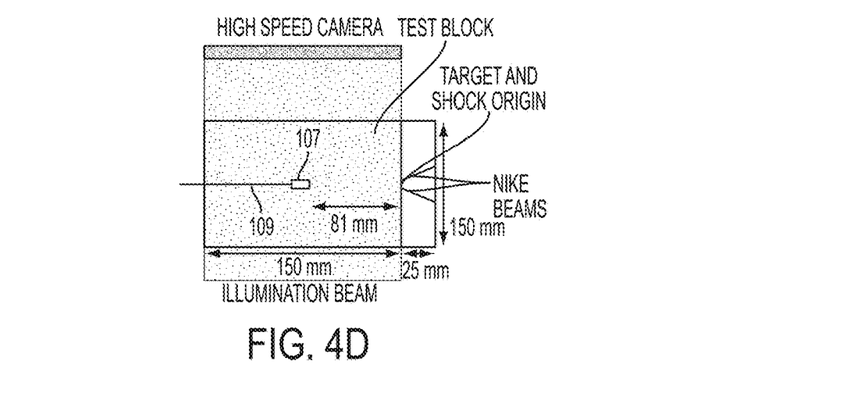
Figure 5:
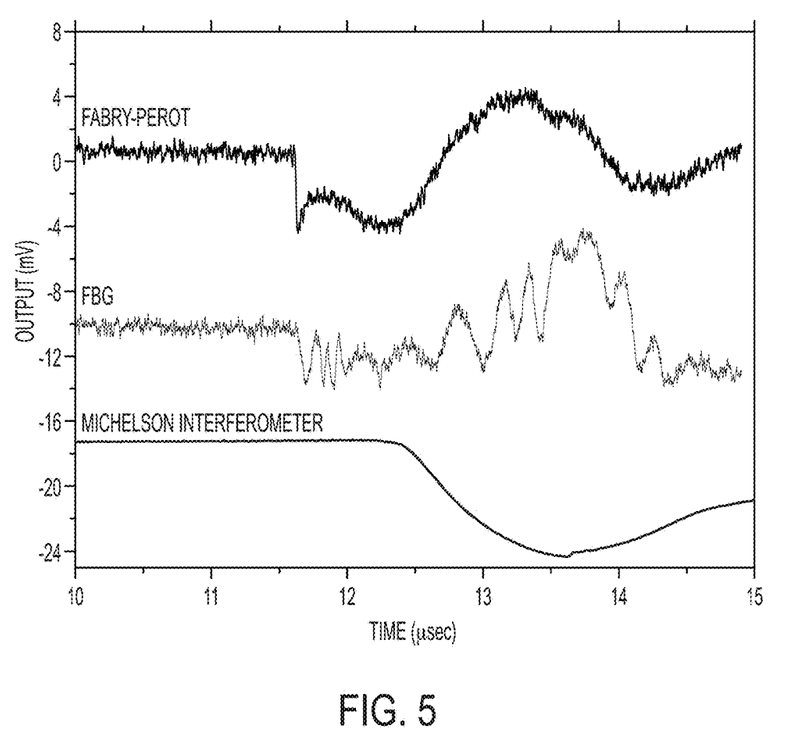
FIG. 5 is a comparison of shock wave measurements for the fiber Fabry-Perot, fiber Bragg grating (FPG) and Michelson interferometer according to the invention, showing the oscillatory behavior observed in the FBG response arises from distortion of the FBG spectra due to the shock front.

Initial tests were carried out on a PMMA block incorporating all three sensors. The sensors were placed in parallel approximately 30 mm from the target face, as shown in FIGS. 4A, 4C and 4D. For these tests, the NIKE laser operated with 40 beams at 34.6 J/beam giving a total pulse energy of 1.38 kJ at 248 nm. This was focused in a 1 mm spot size onto a foil target (100 μm thick Mylar) mounted onto the front face of the test block with a 1.5 mm air gap between the target and block. The focused laser beam impacts the target and through chemical decomposition or ablation launches a shock pulse into the block. This block was placed in a vacuum chamber, illustrated in FIG. 4B. The sensor fibers exit the vacuum chamber through a custom designed fiber optic feed-through. This is connected to the optoelectronic units through a 25 m cable, contained within a separate shielded room. Data are recorded on a digital oscilloscope that is triggered by an appropriately delayed signal from the laser facility. The results from a shot on this block are shown in FIG. 5.

The Fabry-Perot sensor captures the shock front that arrives at 11.5 psec. The increase in pressure due to the shock wave compresses the sensor tip, causing the resonance to shift to shorter wavelength. This produces a reduction in the reflected power and therefore a drop in the measured voltage. The sensor output voltage is observed to increase after this initial drop and then decrease again. This behavior occurs due to the resonance minimum, shown in FIG. 3A, being shifted to a lower wavelength than the probe wavelength (i.e. the sensor is driven beyond its linear region). The sensor is therefore capable of responding to the peak pressure produced by the shock, but must be linearized to obtain the correct response.

The fiber Bragg grating also responds to the shock, however significant oscillation is observed after the initial shock front has arrived and continues for the remainder of the signal. It will be shown later that the shock wave speed is approximately 2.80 km/s. Taking the rise time of the shock front from the Fabry-Perot measurement to be ~100 ns, this yields a spatial extent of ~0.28 mm, which is less than the length of the FBG. This nonuniform stress distribution across the FBG is likely to induce significant distortion of the FBG spectra, causing the oscillatory response observed in FIG. 5.

The Michelson interferometer produces a more slowly varying signal, indicative of the shock induced mass displacement. Temporal differentiation of this signal yields the mass velocity, which is closely related to the shock pressure. The signal to noise from the MI can be seen to be significantly better than the other two sensors, indicating that it provides a more sensitive measurement.

Figure 6:
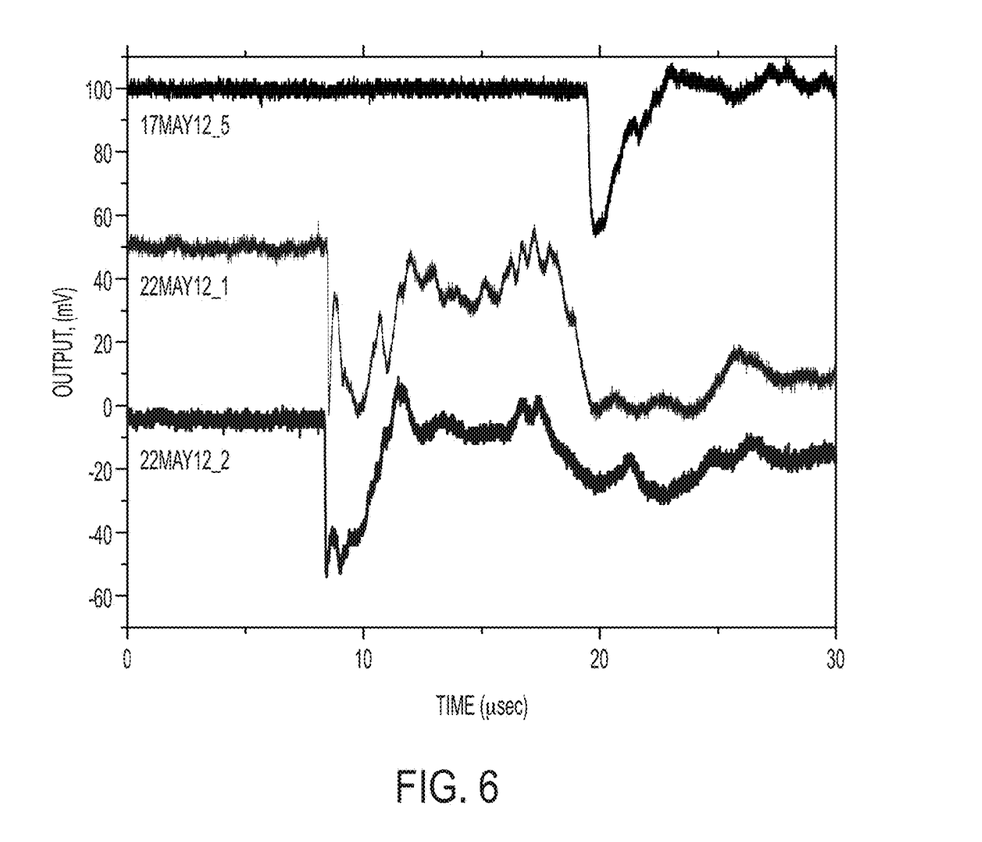
FIG. 6 shows pressure measurements for three shots with the fiber Fabry-Perot according to the invention.

Further tests were carried out on the Fabry-Perot sensor using a different test block, illustrated in the lower right of FIG. 4A. A target consists of a foil placed in-side a conic opening on one side of the PMMA block (labeled 'laser in'). A 1 mm air gap exists between the target and the PMMA block. For measurements 17may12 5, 22may12 1 and 22may12 2, the targets are plastic (thickness 12 μm), Ag (thickness 0.9 μm) and Cu (thickness 1 μm) respectively. The metals are deposited in on a 1 μm thick polypropylene sheet. A detailed view of the probe arrangement in the block is shown in FIG. 4B. The tip of the pressure sensor is located 88.9 mm from the surface where the shock wave initiates. For these tests, the NIKE laser operated with 48 beams at 34.6 J/beam producing a total pulse energy of 1.66 kJ. The results from three separate shots are shown in FIG. 6 (note that the later arrival time of the shot labeled 17may12 5 is due to a difference in trigger time of the digital oscilloscope).

Figure 7:
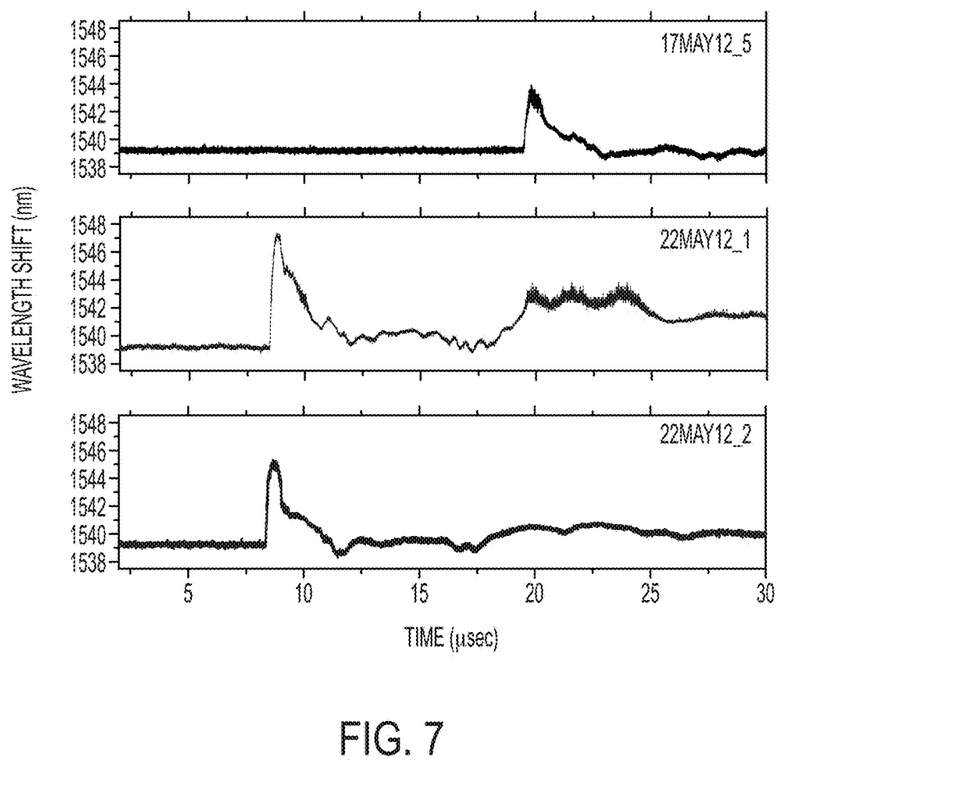
FIG. 7 shows linearized measurements for the three shots shown in FIG. 6.

For each shot, the response of the Fabry-Perot is driven beyond its region of linearity. To enable comparison, the three measurements were linearized by applying the response function, shown in FIG. 3A, to each dataset. The results are shown in FIG. 7 and are plotted in terms of the shift of the optical resonance in wavelength. The measurement corresponding to 17may12 5 produced the smallest signal. However, it was later found that the target was mounted incorrectly in this test block and the block had exploded during testing. This may have reduced the efficiency with which the shock wave was generated within the block. The peak response measured for shot 22may12 1 was 28% higher than for shot 22may12 2 and may be due to variation in the sensor response and/or error in the linearization procedure.

Figure 8:
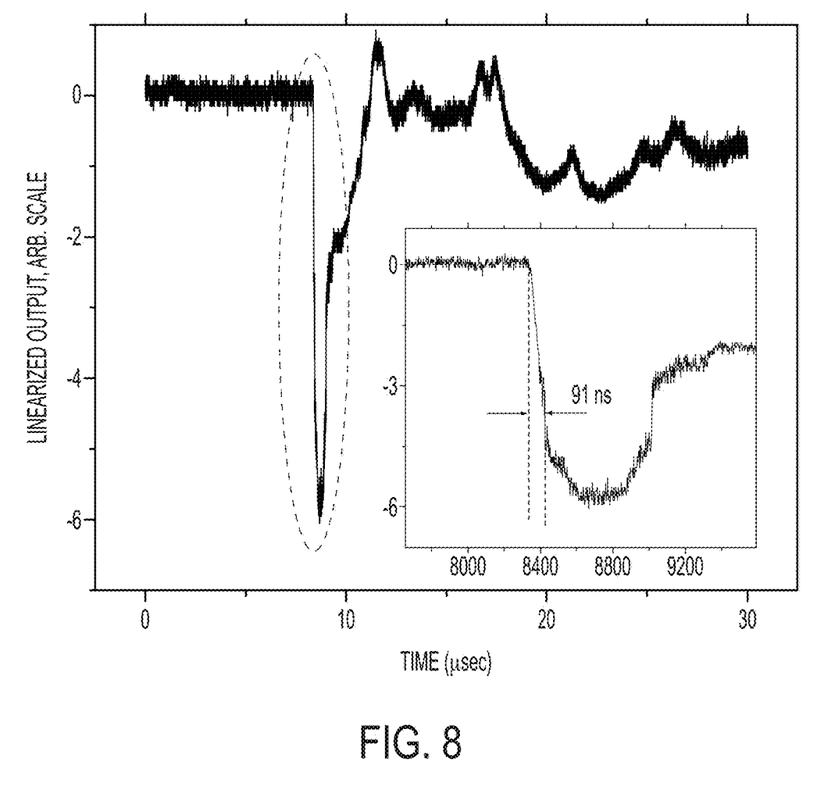
FIG. 8 shows linearized pressure measurements from Fabry-Perot (22may12 2) (inset) showing an enlargement of the measured shock front (horizontal scale is in nsec) according to the invention.

FIG. 8 shows a magnified view of the measurement corresponding to 22may12 2. The inset shows the rise time to be 91 ns for the initial shock front. A similar rise time (~100 ns) is also found for the 22may12 1 measurement.

Figure 9:
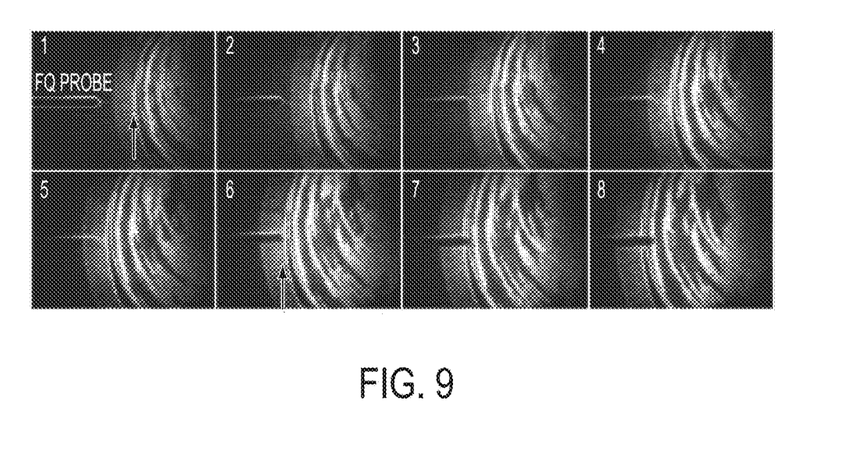
FIG. 9 shows the shadowgraphy measurement for the shot 22may12 1 (arrow indicates the shock front) according to the invention.

The results from a shadowgraphy measurement for the shot 22may12 1 are shown in FIG. 9. Each frame corresponds to a temporal evolution of 3 µs. The shock front, highlighted with an arrow in frame 1, reaches the sensor at frame 6. As it propagate past the probe in frames 7 and 8, the shock front is obscured by the opaque epoxy used to embed the pressure sensor. The velocity of the shock front is estimated from this measurement and the measurement for 22may12_2 to be 2.80 km/s in both cases. Using published data for the relationship between the sound speed and shock wave pressure for PMMA [see e.g. D. Moore, D. Funk, and S. McGrane, At the Confluence of Experiment and Simulation: Ultrafast Laser Spectroscopic Studies of Shock Compressed Energetic Materials in Chemistry at Extreme Conditions, edited by M. Riad Manaa (Elsevier, Amsterdam, 2005; L. Barker and R. E. Hollenbach, "Shockwave studies of pmma, fused silica, and sapphire," J. Appl. Phys. 41 (1970), S. Marsh, LASL Shock Hugoniot Data. (University of AgencyReport No. MSL-71-24/DNA2810F (1980), and D. R. Christman, Final Report to the Defense Nuclear, California Press, Berkley, Calif., 1980).], the peak pressure is estimated to be 0.045 GPa.

Figure 10:
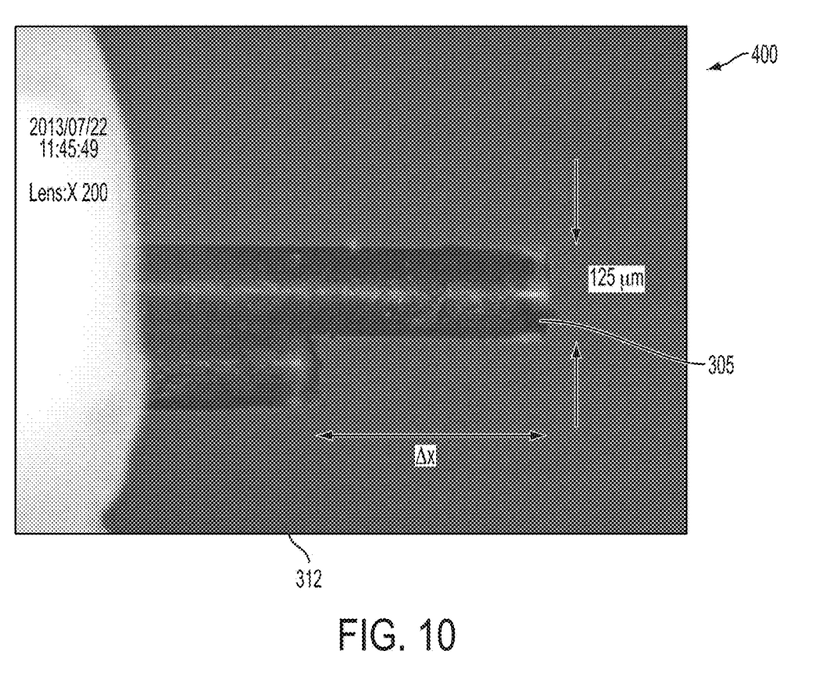
FIG. 10 shows a differential displacement sensor according to the invention.
Figure 11:
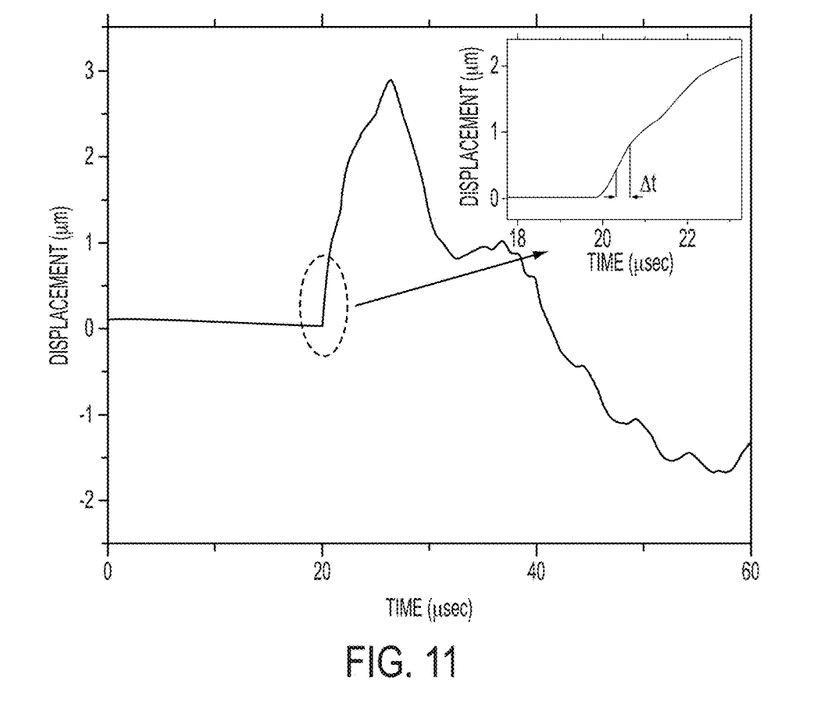
FIG. 11 shows a typical measurement from a single mass displacement sensor (inset) illustrating the temporal resolution required to reconstruct the mass velocity.
Figure 12:
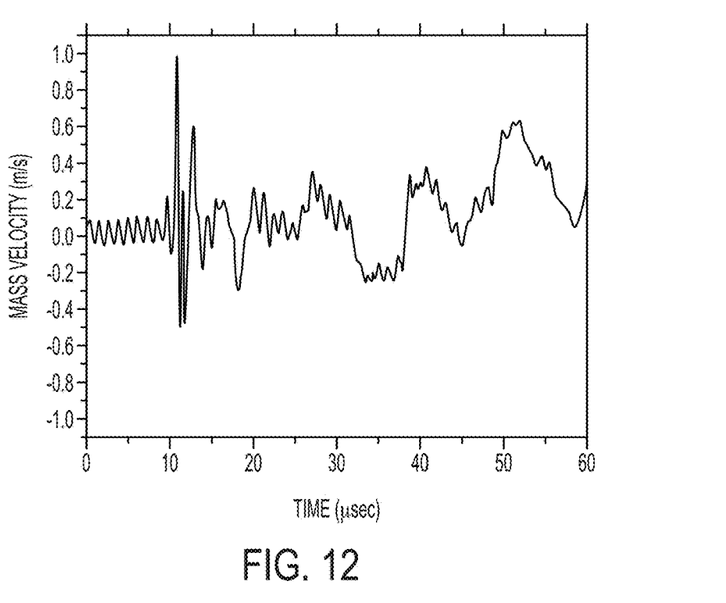
FIG. 12 shows a measurement from a differential displacement sensor according to the invention.

Referring now to FIGS. 10-12, a differential displacement sensor 400 measures directly the mass velocity generated by a shock wave propagating in a solid material. A prototype differential displacement sensor 400 is shown in FIG. 10. Two mirrored fibers 305 and 312 are aligned parallel to each other with an axial spacing between the endfaces equal to $\Delta x$. Each fiber forms one arm of a Michelson interferometer 200. A shock wave propagating into the endfaces of the fiber will cause axial displacement of the mirrors. The axial separation of the mirrors causes each one to experience a slightly different displacement depending on the shape of the shock wave front. The phase shift measured by the Michelson interferometer corresponds to difference in phase between the two interferometer arms or the rate of change of mass displacement due to the travelling shock wave and is equal to the mass velocity.

To ensure that the mass velocity is reproduced accurately, the axial separation between the fiber endfaces must be small enough to respond to rapid changes in the mass displacement. FIG. 11 shows a typical measurement of the mass displacement due to a shock wave entering the endface of a single mirrored fiber tip. When two fiber tips are collocated, each endface experiences a displacement similar to that shown in FIG. 11 with a temporal separation of, $$\Delta t = \frac{\Delta x}{U_s}$$

where $U_s$ is the shock wave velocity and $\Delta x$ is the axial separation of the mirrors. To capture very rapid changes in mass displacement, $\Delta t$ should be made as small as possible. However, the sensor response diminishes as $\Delta t \rightarrow 0$, so a small but nonzero $\Delta t$ is typically required. For shock waves pressures in the MPa range, a separation of 10-50 µm corresponds to a temporal resolution of ~3.5-18 nsec, assuming a shock velocity of 2770 m/s. For the case of shock waves pressure in the GPa range, a smaller separation of 1-5 microns may be required.

FIG. 12 shows a measurement taken with a prototype differential displacement sensor with an axial separation between the fiber tips, $\Delta x$=228 µm. This tip separation is larger than optimum for accurately reconstructing the mass velocity, however, the measured signals resembles the expected mass velocity signal amplitude and duration for this type of shock wave and demonstrates the validity of this sensor approach. It should be noted that the output of this sensor is proportional to the mass velocity. The single endface Michelson interferometer produces an output proportional to the mass displacement. The output of this sensor must therefore be differentiated to yield the mass velocity.

Applications of this sensor include characterizing shock wave propagation effects in solid materials for understanding energy dissipation and channeling. The sensor responds to shock velocity preferentially in the axial direction along the fiber and is therefore a directional sensor. Three sensors mounted in orthogonal axes can be used to reconstruct the three vector components of mass velocity. By combining this three-axis velocity sensor with a fiber optic pressure sensor 100, the energy in the shock wave can also be characterized (this measurement requires three components of velocity and pressure) for the case when the shock wavefront is nonplanar. For the case of a planar shock wavefront, a single velocity measurement in the direction of shock propagation and pressure measurement is adequate to calculate shock energy.

Another configuration using any of the above-described sensors—Fabry-perot, fiber Bragg grating or MI sensor—that these sensors can be used in is for measuring shock velocity. By positioning two sensors at different radial distances from the shock origin, the shock velocity can be determined from the arrival time at each sensor. The shock arrival time can be measured very accurately from the change in the sensor output, at the instant the shock arrives. The difference in radial distance of each sensor from the shock origin should be approximately in the range from 5 mm to 20 mm. For example, if the radial separation of two sensors is 10 mm, and the difference in arrival times for the shock at each sensor is 3.33 microsecond, then the mean shock velocity between the two probes is 3000 m/s. The positional accuracy and separation of the sensors will determine the accuracy to which shock velocity is determined. Preferably, the radial separation is in the range of 5 mm to 20 mm.

Thus, while the present' invention has been described with respect to exemplary embodiments thereof, it will be understood by those of ordinary skill in the art that variations and modifications can be effected within the scope and spirit of the invention.

What is claimed as new and desired to be protected by Letters Patent of the United States is:

1. A differential displacement sensor for measuring a shock wave mass velocity in a solid media, comprising
    a Michelson interferometer (MI) having an input and an output, comprising;
        a first interferometric arm comprising a cleaved first optical fiber with a first end face having a first mirror surface coating thereon,
        a second arm comprising a cleaved second optical fiber, an acousto-optic modulator, and a second end face having a second mirror surface coating thereon,
        a coherent laser coupled to the MI input, and
        a detector coupled to the MI output, and wherein
            the first and second optical fibers are aligned parallel to each other and the first and second endfaces are spaced-apart axially a distance sufficient so as to register a measurable phase shift due to a differential displacement of the first and second endfaces corresponding to a rate of change of a mass displacement due to a travelling shock wave in the solid media equal to the mass velocity.

2. The differential displacement sensor of claim 1, further comprising
a fiber optic pressure sensor for further characterizing an energy in the shock wave.

3. The differential displacement sensor of claim 1, wherein the axial spacing between the first and second endfaces is in the range of from 1 µm to 250 µm.

4. A method of measuring a shock wave mass velocity in a solid media, comprising:
providing a first Michelson interferometer (MI) having an input and an output, comprising:
a first arm comprising a cleaved first optical fiber with a first end face having a first mirror surface coating thereon,
a second arm comprising a cleaved second optical fiber, an acousto-optic modulator, and a second end face having a second mirror surface coating thereon,
a coherent laser coupled to the MI input, and
a detector coupled to the MI output, and wherein
the first and second optical fibers are aligned parallel to each other and the first and second endfaces are spaced-apart axially a distance sufficient so as to register a measurable phase shift due to a differential displacement of the first and second endfaces corresponding to a rate of change of a mass displacement due to a travelling shock wave equal to the mass velocity;
positioning the first and second fibers in the solid media;
exposing the solid media to a shock wave; and
measuring one or more desired characteristics of the shock wave.

5. The method of claim 4, further comprising determining the direction of the shock wave based on the measured characteristics.

6. The method of claim 4, further comprising:
providing three sensors mounted in orthogonal axes as a three-axis velocity sensor,
reconstructing three vector components of mass velocity,
combining the three-axis velocity sensor with a fiber optic pressure sensor, and
characterizing a shock energy when the shock wavefront is nonplanar.

7. The method of claim 4, further comprising measuring a single velocity measurement in the direction of shock propagation and pressure measurement to calculate a shock energy when the shock wavefront is planar.

8. The method of claim 4, further comprising providing and positioning a second sensor, selected from the group consisting of Fabry-perot, fiber Bragg grating and a second MI sensor, at a first radial distance from the shock wave and positioning the first MI at a second radial distance from the shock wave different than the first radial distance, and
measuring the shock velocity by determining a difference in arrival times at the respective sensors.

9. The method of claim 8, wherein the difference between the first and second radial distances is in the range of 5 mm to 20 mm.

* * * * *